UNITED STATES PATENT OFFICE.

ROBERT F. LANGER, OF SAN FRANCISCO, CALIFORNIA.

ART OF MAKING PHOSPHORESCENT COLORS.

1,244,058.     Specification of Letters Patent.     Patented Oct. 23, 1917.

No Drawing.     Application filed March 15, 1916. Serial No. 84,258.

*To all whom it may concern:*

Be it known that I, ROBERT F. LANGER, a citizen of the United States, and resident of San Francisco, in the county of San Francisco and State of California, have invented certain new and useful Improvements in Art of Making Phosphorescent Colors, of which the following is a specification.

The invention relates to the method of preparing and compounding substances which will "phosphoresce" or give off light after being stimulated by exposure to a light source, and other substances which when used in conjunction with the phosphorescent substances, will cause emission of light of various colors. The principal object of the invention is to provide such substances which when used in combination with one another, will emit phosphorescent light of any desired color after stimulation, and which will continue to do so for a considerable period after having been removed from the stimulating light source.

A further object is to provide phosphorescent compositions which can be used in the nature of a paint or coating for various objects to render them visible in the dark and in any desired luminous color or combination of colors.

This would be found useful, for example, in the case of railroad crossing, warning and other signals, motor car signals, auto-road bulletins, street signs, house numbers, fire alarm boxes, night bell signs for doctors, watchmen and the like, "To-let", "For sale", etc., signs, for marking bottles and packages containing dangerous or poisonous substances, advertising and novelty devices, Christmas-tree ornaments, names of firms and buildings, hotels, hospitals and stations, to show the location of bells, electric light switches, match containers, etc., for "Danger", "Exit", etc., signs, for illuminating the interior of wardrobes, etc.

The composition may also be used for decorative purposes; for example, pictures, designs, coats-of-arms and the like may be painted or printed with the various comtpositions, so that the resultant phosphorescent light will cause the picture or design to appear luminous in the dark in its appropriate colors.

The composition used for producing this vari-colored phosphorescent effect is composed of the substances as specified below and prepared and treated in the manner hereinafter described.

No. 1—Yellow phosphorescent composition, is that primarily used for causing phosphorescence and is composed of lithium carbonate, sulfur, barium carbonate, distilled water and ethyl alcohol. This substance by itself will produce phosphorescent light yellow in color. When coated however, with any of the compositions named below, the wave length of the light emitted will be altered and the resulting light be of the corresponding color.

These secondary compositions are composed as follows:—

No. 2—Green composition: Thorium nitrate, strontium thiosulfate, bismuth nitrate, potassium sulfate, starch, sulfur, ethyl alcohol and distilled water.

No. 3—Yellow composition: Manganese sulfite, strontium carbonate, sodium chlorid, sulfur, anhydrous sodium carbonate and ethyl alcohol.

No. 4—Red composition: Rubidium carbonate, lithium carbonate, barium carbonate, sulfur, distilled water and ethyl alcohol.

No. 5—Light blue composition: Calcium oxid, starch, calcium sulfate, sulfur, sodium sulfate, bismuth nitrate solution (in alcohol), unranium nitrate solution, distilled water and ethyl alcohol.

No. 6—Blue composition: This may be composed of ammonia alum, cobalt sulfate, distilled water, ethyl alcohol and (*a*) zinc sulfate, or (*b*) lead sulfate.

No. 7—Violet composition: Sodium sulfate, calcium sulfate, calcium oxid, starch, sulfur and a solution of bismuth nitrate in absolute alcohol.

In preparing any of these compositions the dry ingredients, in pulverized form, are first thoroughly mixed. Solutions are then prepared of bismuth nitrate and uranium nitrate in approximately the proportion of 0.5 oz. of nitrate to 100 c. c. absolute alcohol. Sufficient of one or the other of these solutions, or of water or alcohol, or all as the case may be, is then added to the dry ingredients to form a paste and the whole thoroughly mixed. Small quantities of thallium salts may also be added, which will materially increase the luminescent effect.

As an example of such a mixture, the No. 7 composition may be mixed in the following proportions:—

| | |
|---|---|
| Sulfur | 0.12 oz. |
| Sodium sulfate | 0.5 " |
| Calcium sulfate | 0.5 " |
| Calcium oxid | 40. " |
| Starch | 2. " |
| Thallium salt | trace. |

These substances are pulverized and thoroughly mixed, after which 1 c. c. of bismuth nitrate solution, prepared as described, is added and stirred into the mixture.

The mixture thus prepared is next heated in an oven to 1000 F. or higher and thoroughly baked and desiccated, after which it is ground in any suitable one of the heavier mineral oils, such as paraffin oil, petrolatum or the like. To this is added a suitable drier and the mixture applied where desired as a paint, or it may also be used for printing the pattern or design required.

When an object or surface is to be rendered phosphorescent, the No. 1 or yellow phosphorescent composition is first applied by painting or printing and after this has become dry, any suitable one of the other compositions is applied over the first to produce luminescence of the desired color.

In order to render the paint proof against the action of water, damp weather, etc., a varnish or lacquer may finally be applied.

Surfaces treated in this way and exposed to the light for a short time, will glow or phosphoresce in the dark for a considerable period, so that signs, names, etc., the characters of which are painted or printed with this paint, and which are exposed to daylight, will continue to be visible in any desired color or combination of colors after dark.

Having thus described my invention and the manner of its preparation and use, what I claim as new and desire to secure by Letters Patent is:—

The art of producing phosphorescent colors which consists of first coating the surface with a basic composition comprising lithium carbonate, sulfur, barium carbonate, water and alcohol and adding a composition consisting of manganese sulfite, strontium carbonate, sodium chlorid, sulfur, anhydrous sodium carbonate and ethyl alcohol thereby altering the influence of light rays according to the nature of the second composition.

Signed at San Francisco, in the county of San Francisco and State of California this 29th day of February, A. D. 1916.

ROBERT F. LANGER.

Witnesses:
BENJ. WM. KING,
ALFRED E. DAY.